United States Patent
Liu et al.

(10) Patent No.: US 8,854,705 B2
(45) Date of Patent: Oct. 7, 2014

(54) CARRIER AND IMAGE SCANNING APPARATUS HAVING THE CARRIER

(71) Applicants: Lite-On Electronics (Guangzhou) Limited, Guangzhou (CN); Lite-On Technology Corp., Taipei (TW)

(72) Inventors: Chun-Liang Liu, Taipei (TW); Ta-Yi Lee, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 13/933,188

(22) Filed: Jul. 2, 2013

(65) Prior Publication Data

US 2014/0104660 A1    Apr. 17, 2014

(30) Foreign Application Priority Data

Oct. 11, 2012 (CN) ...................... 2012 2 0519089 U (51) Int. Cl.
*H04N 1/10* (2006.01)

(52) U.S. Cl.
CPC .................................. *H04N 1/1039* (2013.01)
USPC ........... 358/497; 358/474; 358/471; 358/482; 358/483

(58) Field of Classification Search
CPC ... H04N 1/193; H04N 1/1017; H04N 1/1013; H04N 2201/1016; H04N 2201/0425; H04N 1/40056; H04N 1/03; H04N 3/1581; H04N 2001/03318; H04N 1/12; H04N 2201/00849; H04N 1/486; H04N 1/484; G02F 1/055
USPC ................ 358/497, 474, 471, 496, 483, 482, 358/512–514, 505; 250/234–236, 239, 216, 250/208.1; 399/211
See application file for complete search history.

(56) References Cited

U.S. PATENT DOCUMENTS

| | | | | |
|---|---|---|---|---|
| 5,468,943 A * | 11/1995 | Gatto et al. | .................... | 235/454 |
| 5,864,410 A * | 1/1999 | McVicar | ........................ | 358/498 |
| 6,285,441 B1 * | 9/2001 | Takahara | ......................... | 355/67 |
| 6,961,156 B2 * | 11/2005 | Hsiao | ............................. | 358/497 |
| 7,016,088 B2 * | 3/2006 | Yokota et al. | ................. | 358/474 |
| 7,075,686 B2 * | 7/2006 | Hayashi | ........................ | 358/497 |
| 7,088,476 B2 * | 8/2006 | Yokota et al. | ................. | 358/474 |
| 7,532,371 B2 * | 5/2009 | Peng | ............................. | 358/474 |
| 7,738,146 B2 * | 6/2010 | Osakabe et al. | ............. | 358/497 |
| 7,746,522 B2 * | 6/2010 | Oguri et al. | ................... | 358/497 |
| 7,831,188 B2 * | 11/2010 | Lee | ............................. | 399/329 |
| 7,884,974 B2 * | 2/2011 | Osakabe | ........................ | 358/471 |
| 7,911,663 B2 * | 3/2011 | Tamai | ............................ | 358/497 |
| 8,289,587 B2 * | 10/2012 | Yamauchi | ..................... | 358/497 |
| 8,537,436 B2 * | 9/2013 | Murray | .......................... | 358/497 |
| 8,659,807 B2 * | 2/2014 | Hara et al. | .................... | 358/497 |
| 2006/0203300 A1 * | 9/2006 | Choi | ............................. | 358/474 |

\* cited by examiner

*Primary Examiner* — Cheukfan Lee
(74) *Attorney, Agent, or Firm* — Rosenberg, Klein & Lee (57) ABSTRACT

An image scanning apparatus includes a base, a transparent plate, a guide rod disposed between the base and the transparent plate, an optical sensor module, and a carrier mounted on the guide rod and including a first support bracket to place the optical sensor module thereto and having a first pivot connecting portion, a second support bracket having a second pivot connecting portion connected pivotally to the first pivot connecting portion, and an elastic member disposed between the first and second support brackets and biasing upwardly the first support bracket so as to keep the optical sensor module in constant contact with the transparent plate.

18 Claims, 8 Drawing Sheets

CARRIER AND IMAGE SCANNING APPARATUS HAVING THE CARRIER

CROSS REFERENCE TO RELATED APPLICATION

This application claims priority of Chinese Patent Application No. 201220519089.9, filed on Oct. 11, 2012.

BACKGROUND OF THE INVENTION

1. Field of the Invention

The invention relates to an image scanning apparatus, more particularly to an image scanning apparatus that utilizes a contact image sensor (CIS) module and that has a carrier.

2. Description of the Related Art

A contact image sensor (CIS) module is a high modular optical sensor module, which includes an optical lens, a sensing component and a photoelectric conversion circuit. Since the CIS module is small, it is widely used in flatbed image scanners so as to reduce an overall volume or size of the machine.

However, because the depth of field (DOE) of the CIS module is only plus or minus 0.3 mm, how to make the CIS module in steady contact with a transparent glass plate during a scanning process of a flatbed image scanner becomes a primary key in obtaining high quality scanned images. As such, many different inventions and designs have been disclosed, such as Taiwanese Patent Numbers TW364709, TW381801, and TW420335. Each of these patents mainly uses a carrier box to accommodate the CIS module, and then through an elastic structure that is disposed between the carriage box and a transmission device which guides movement of the carrier box or that is disposed between the carriage box and the CIS module to provide an upward supporting force, the CIS module can be kept in contact with the transparent glass plate during scanning. However, because the carrier box not only occupies a substantial space of an inner portion of the flatbed image scanner so that the overall volume or size of the machine cannot be effectively reduced, the number of the assembly process and the assembly component thereof are also increased. The purpose of lowering the costs and having a small, light and thin size cannot thus be easily achieved.

SUMMARY OF THE INVENTION

Therefore, an object of the present invention is to provide a carrier of an image scanning apparatus that can effectively reduce the overall volume or size of the image scanning apparatus, that can simplify the assembly process, and that can reduce the number of assembly component so as to minimize the costs thereof and to obtain a thin, light and small image scanning apparatus.

According to one aspect of this invention, a carrier for mounting on a guide rod of a flatbed scanning apparatus and for carrying an optical sensor module comprises a first support bracket, a second support bracket, and an elastic member. The first support bracket includes a load-bearing portion for placement of the optical sensor module thereto and having opposite first and second lateral ends, a first pivot connecting portion extending outwardly from the first lateral end, and a first limiting portion extending downwardly from a bottom surface of the load-bearing portion in proximity to the second lateral end. The second support bracket is disposed below the first support bracket and includes a main seat adapted to be mounted slidably on the guide rod and having opposite first and second ends, a second pivot connecting portion extending upwardly from the main seat in proximity to the first end and connected pivotally to the first pivot connecting portion, and a second limiting portion provided on the main seat in proximity to the second end and corresponding in position to the first limiting portion. The first and second limiting portions cooperate with each other to restrict horizontal movement of the first support bracket relative to the second support bracket. The elastic member is disposed between the first and second support brackets and biases upwardly the first support bracket.

Another object of the present invention is to provide an image scanning apparatus having a carrier that can effectively reduce the overall volume or size of the image scanning apparatus, that can simplify the assembly process, and that can reduce the number of assembly component so as to minimize the costs thereof and to obtain a thin, light and small image scanning apparatus.

According to another aspect of this invention, an image scanning apparatus comprises a base having a bottom wall and a surrounding wall extending upwardly from a peripheral edge of the bottom wall, a platform mounted to and covering the base and including a transparent plate facing the base, a guide rod disposed between the base and the transparent plate, an optical sensor module, and a carrier mounted on the guide rod and carrying the optical sensor module. The carrier includes a first support bracket, a second support bracket, and an elastic member. The first support bracket has a load-bearing portion to place the optical sensor module thereto and including opposite first and second lateral ends, a first pivot connecting portion extending outwardly from the first lateral end, and a first limiting portion extending downwardly from a bottom surface of the load-bearing portion in proximity to the second lateral end. The second support bracket is disposed below the first support bracket and includes a main seat mounted slidably on the guide rod and having opposite first and second ends, a second pivot connecting portion extending upwardly from the main seat in proximity to the first end and connected pivotally to the first pivot connecting portion, and a second limiting portion provided on the main seat in proximity to the second end and corresponding in position to the first limiting portion. The first and second limiting portions cooperate with each other to restrict horizontal movement of the first support bracket relative to the second support bracket. The elastic member is disposed between the first and second support brackets and biases upwardly the first support bracket so as to keep the optical sensor module in constant contact with the transparent plate of the platform.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

The above-mentioned and other technical contents, features, and effects of this disclosure will be clearly presented from the following detailed description of four preferred embodiments in coordination with the reference drawings.

Before this invention is described in greater detail, it should be noted that similar elements are designated by the same reference numerals throughout the disclosure.

The image scanning apparatus according to this invention may be applied to a flatbed scanner (FB scanner) or a multi-function printer (MFP) that utilizes a contact image sensor (CIS) module. The image scanning apparatus applied to a flatbed scanner (FB Scanner) will be described hereinbelow.

Figure 1:
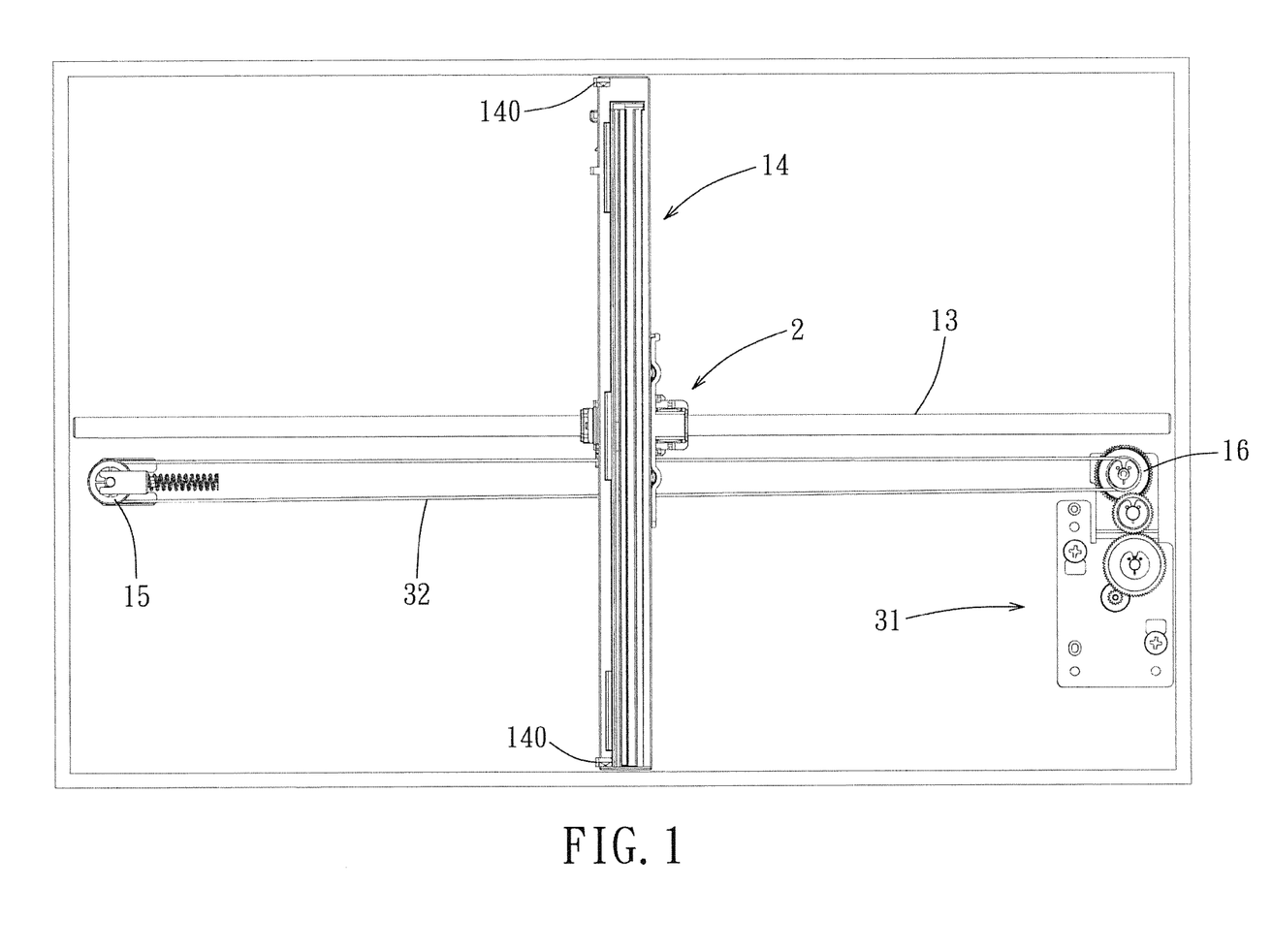
FIG. 1 is a schematic top view of an image scanning apparatus according to the first preferred embodiment of the present invention.
Figure 2:
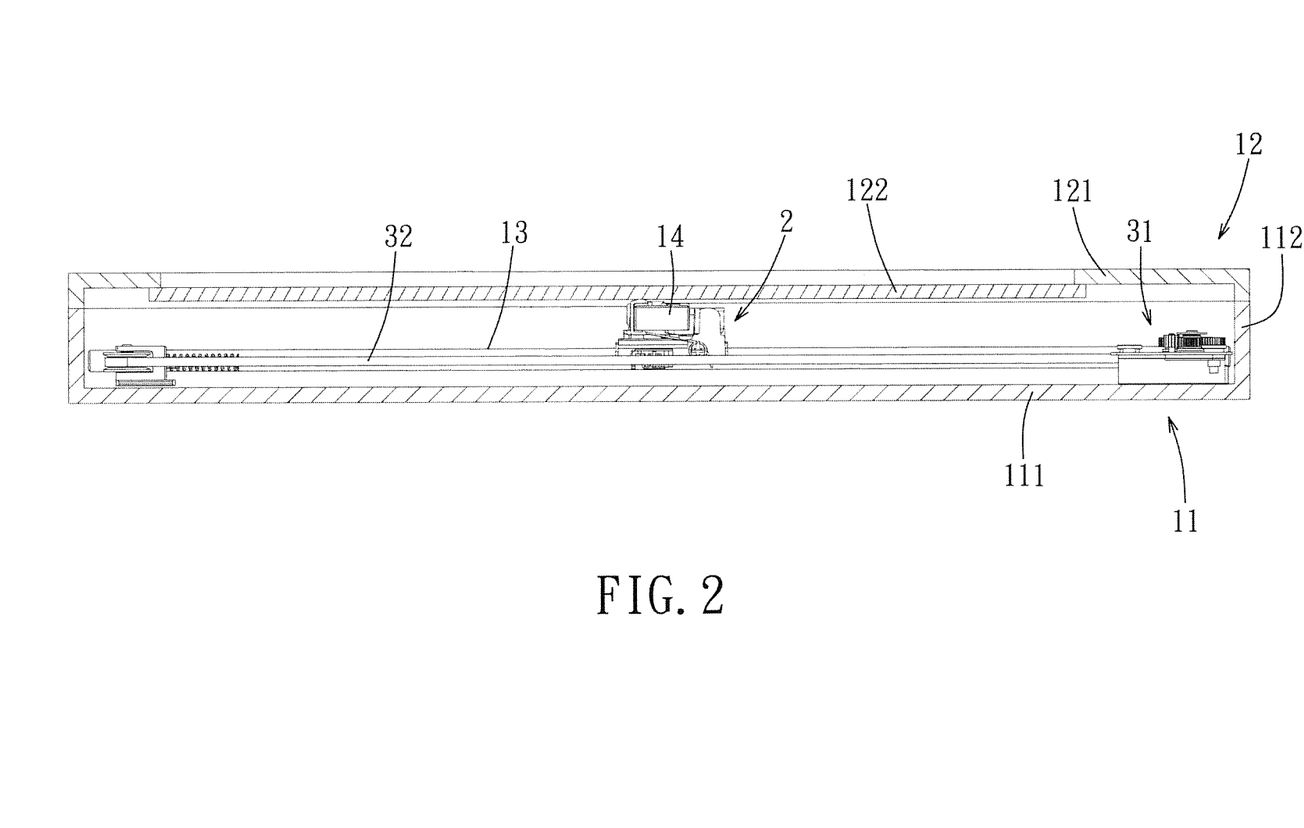
FIG. 2 is a partly sectional side view of the image scanning apparatus of the first preferred embodiment.

Referring to FIGS. 1 and 2, an image scanning apparatus according to the first preferred embodiment of the present invention is shown to comprise a base 11, a platform 12 mounted to and covering the base 11, a guide rod 13 disposed on the base 11, an optical sensor module which is a contact image sensor (CIS) module 14, and a carrier 2 disposed slidably on the guide rod 13 and carrying the CIS module 14 to move along the guide rod 13.

The base 11 has a bottom wall 111 and a surrounding wall 112 extending upwardly from a peripheral edge of the bottom wall 111. The platform 12 includes a frame 121 connected to the surrounding wall 112 of the base 11, and a transparent plate 122 fixed to the frame 121. The transparent plate 122 may be, for example, a transparent glass plate.

The guide rod 13 is disposed at a central portion of the base 11, and is parallel to a long side of the bottom wall 111. Two ends of the guide rod 13 may be respectively fixed to two opposite short sides of the surrounding wall 112 or two opposite ends of the bottom wall 111.

Figure 3:
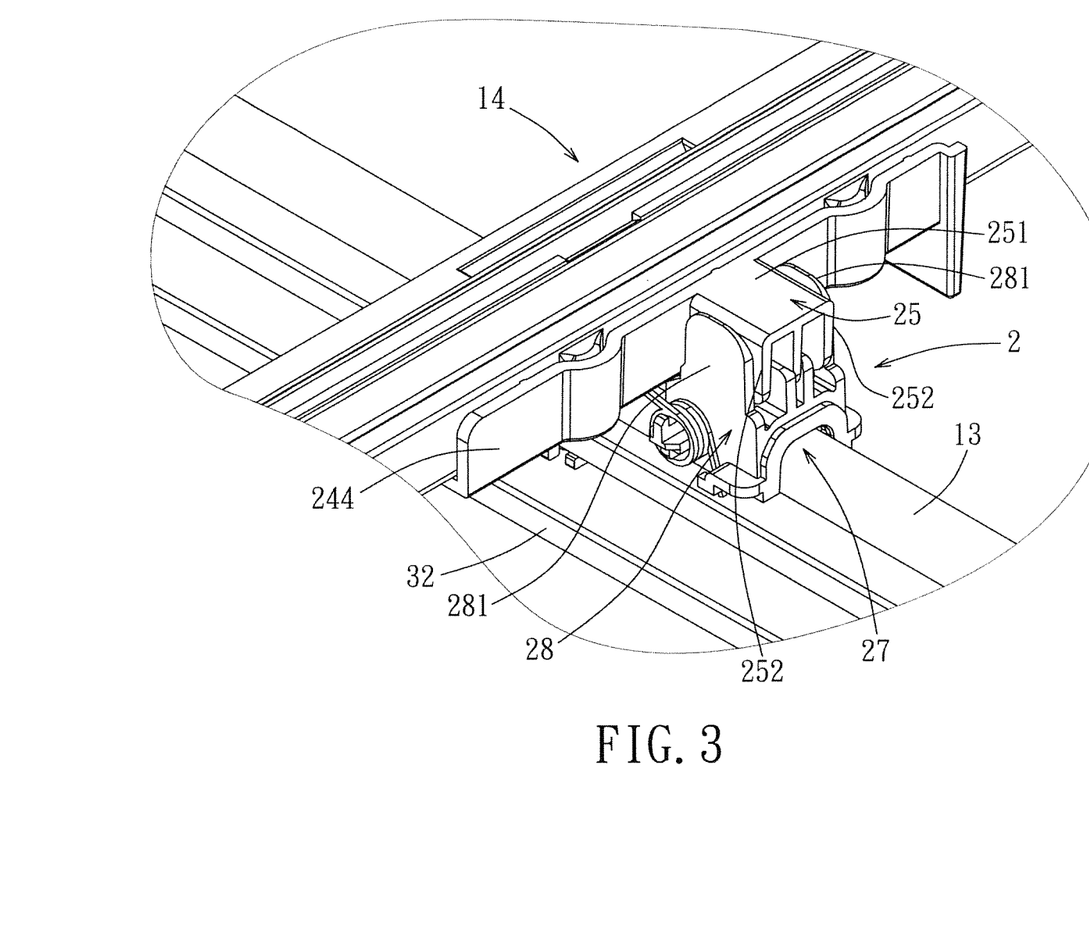
FIG. 3 is an enlarged fragmentary perspective view of the image scanning apparatus of the first preferred embodiment, illustrating a relative positional relationship among a carrier, a guide rod and a CIS module.
Figure 5:
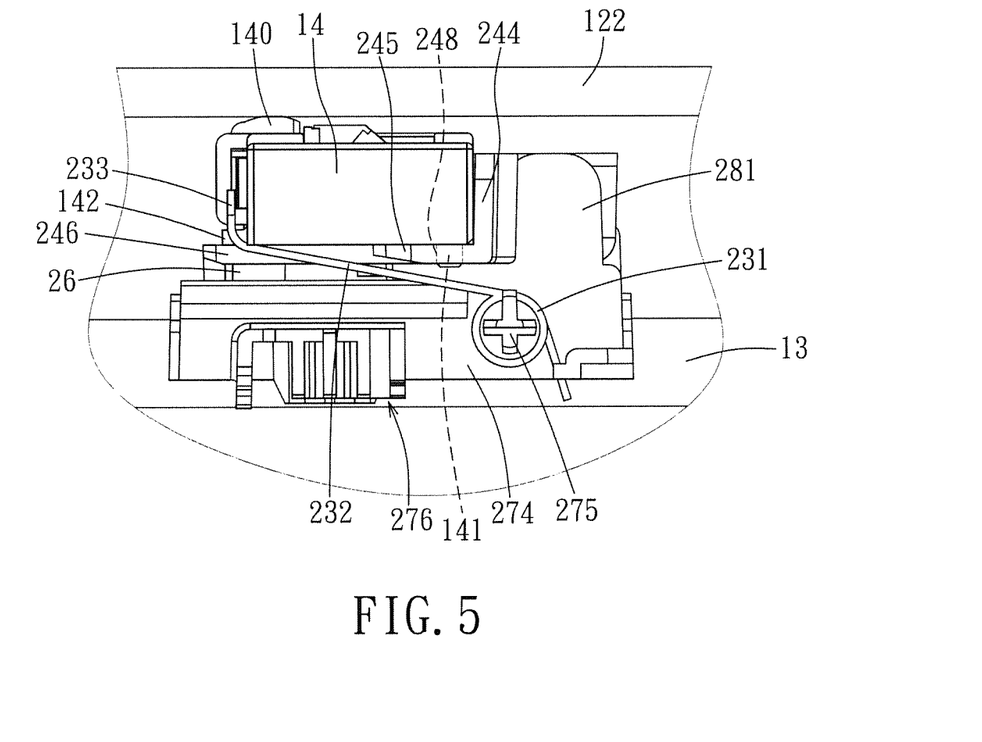
FIG. 5 is an enlarged fragmentary perspective view of the image scanning apparatus of FIG. 2, illustrating a relative positional relationship among a carrier, a guide rod and a CIS module.

The CIS module 14 includes an optical lens, a sensing component, and a photoelectric conversion circuit. The CIS module 14 is fixed to the carrier 2, is parallel to two short sides of the bottom wall 111, and is disposed perpendicularly above the guide rod 13. Further, as shown in FIGS. 1, 3 and 5, more than one skid pads 140 are usually provided on a lateral end of a top surface of a housing of the CIS module 14 for sliding frictional contact with a bottom surface of the transparent plate 122 at fixed points. The skid pads 140 are usually made of plastic or other similar materials, and may be integrally molded on the housing of the CIS module 14. Alternatively, the skid pads 140 may be replaced with balls or rollers that are in sliding or rolling frictional contact with the bottom surface of the transparent plate 122 at fixed points.

Figure 4:
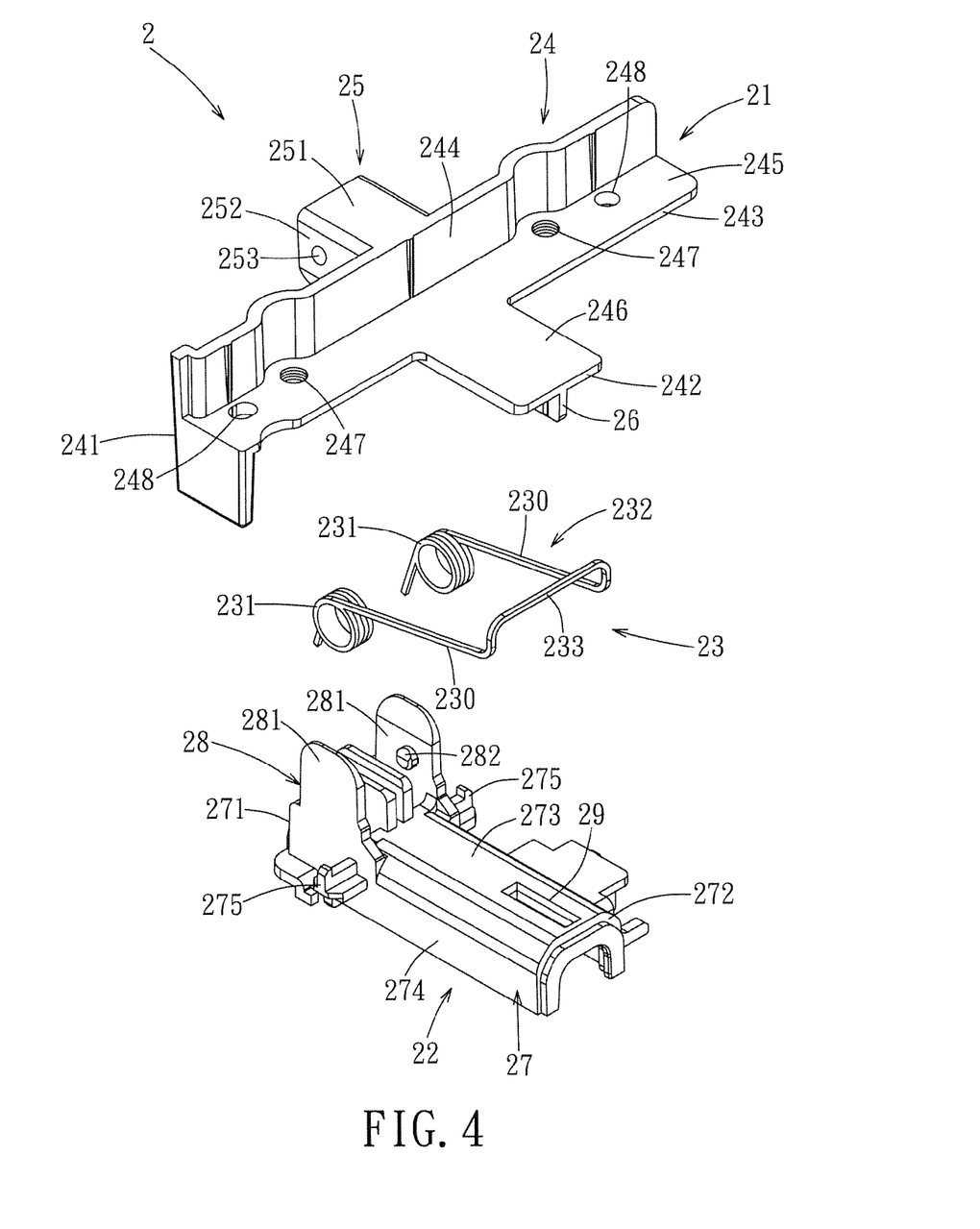
FIG. 4 is an exploded perspective view of a carrier of the image scanning apparatus of the first preferred embodiment.

With reference to FIGS. 3 to 5, the carrier 2 includes a first support bracket 21, a second support bracket 22 and an elastic member 23.

The first support bracket 21 includes a load-bearing portion 24 to support the CIS module 14 and having opposite first and second lateral ends 241, 242, a first pivot connecting portion 25 extending outwardly from the first lateral end 241, and a first limiting portion 26 extending downwardly from a bottom surface of the load-bearing portion 24 in proximity to the second lateral end 242.

Preferably, the load-bearing portion 24 has a substantially L-shaped cross section, and includes a first horizontal plate 243 to place the CIS module 14 thereto and having the first lateral end 241, and a first vertical plate 244 extending upwardly from the first lateral end 241 and abutting against a long side of the CIS module 14. More preferably, the first horizontal plate 243 is substantially T-shaped, and includes a first plate surface 245 and a second plate surface 246. The first plate surface 245 is elongated, and has a long side (which is also the first long side 241 of the load-bearing portion 24) connected to a bottom end of the first vertical plate 244. The second plate surface 246 is rectangular in shape, is connected to the first plate surface 245 opposite to the first vertical plate 244, and has the second lateral end 242 of the load-bearing portion 24. The first plate surface 245 is formed with a plurality of threaded holes 247 to fixedly fasten the CIS module 14 thereto.

To further position the CIS module 14 on the first horizontal plate 243, the first plate surface 245 of the first horizontal plate 243 is further formed with a plurality of positioning holes 248 each being proximate to a respective threaded hole 247, and a bottom surface of the housing of the CIS module 14 is formed with a plurality of positioning studs 141 (only one is shown in FIG. 5) respectively corresponding in position to the positioning holes 248. When the CIS module 14 is placed onto the first horizontal plate 243, the positioning studs 141 are inserted into the respective positioning holes 248 to position the CIS module 14 on the load-bearing portion 24 of the first support bracket 21, so that a fixed fastening of the CIS module 14 to the first horizontal plate 243 can be facilitated.

Preferably, the first pivot connecting portion 25 protrudingly extends from the first vertical plate 244 away from the first horizontal plate 243, and includes a second horizontal plate 251, two second vertical plates 252 extending downwardly from two opposite ends of the second horizontal plate 251, and two pin holes 253 (only one is visible in FIG. 4) respectively formed in the second vertical plates 252.

Preferably, the first limiting portion 26 is a protruding rib that protrudes downwardly from a bottom surface of the second plate surface 246 in proximity to the second lateral end 242 of the load-bearing portion 24.

Referring again to FIGS. 4 and 5, the second support bracket 22 is disposed below the first support bracket 21, and includes a main seat 27 mounted slidably on the guide rod 13 and having opposite first and second ends 271, 272, a second pivot connecting portion 28 extending upwardly from the main seat 27 in proximity to the first end 271 and connected pivotally to the first pivot connecting portion 25, and a second limiting portion 29 provided on the main seat 27 in proximity to the second end 272 and corresponding in position to the first limiting portion 26. The first and second limiting portions 26, 29 are interengaged with each other to restrict horizontal movement of the first support bracket 21 relative to the second support bracket 22.

Preferably, the main seat 27 has a substantially U-shaped cross section with an opening that faces downwardly, and is straddled on the guide rod 13 so that the second support bracket 22 is slidable along the guide rod 13. The main seat 27 includes a top wall 273 extending from the first end 271 to the second end 272, two lateral walls 274 (only one is visible in FIG. 4) extending downwardly and respectively from two opposite long sides of the top wall 273, and two fixing posts 275 protruding outwardly and respectively from the lateral walls 274 in proximity to the first end 271.

The second pivot connecting portion 28 includes two spaced-apart pivot connecting plates 281 extending upwardly and respectively from the lateral walls 274 of the main seat 27 and disposed on outer sides of the respective second vertical plates 252, and two pivot pins 282 (only one is visible in FIG. 4) extending from inner sides of the respective pivot connecting plates 281 into pivotal engagement with the pin holes 253 in the respective second vertical plates 252.

In this embodiment, the second limiting portion 29 is a limiting hole that is formed in the top wall 273 and that receives the first limiting portion or protruding rib 26. Alternatively, the first limiting portion 26 may be a limiting hole, while the second limiting portion 29 may be a protruding rib that extends into the limiting hole.

With reference to FIGS. 4 and 5, the elastic member 23 is disposed between the first and second support brackets 21, 22, and biases upwardly the first support bracket 21 so as to keep the CIS module 14 in constant contact with the transparent plate 122 of the platform 12. In this embodiment, the elastic member 23 is a double torsion spring that has two coiled ends 231 fixed to the respective fixing posts 275, and an intermediate section 232 connecting the two coiled ends 231 and biasing upwardly the load-bearing portion 24 of the first support bracket 21. The intermediate section 232 includes two spaced-apart arms 230 connected respectively to and extending upwardly and inclinedly from the coiled ends 231 toward the second end 272 of the main seat 27, and an inverted U-shaped bight portion 233 connected between the arms 230 opposite to the coiled ends 231 and disposed higher than the first horizontal plate 243.

The CIS module 14 is disposed between the first vertical plate 244 of the load-bearing portion 24 and the positioning portion 233 of the elastic member 23, and has a positioning protrusion 142 (see FIG. 5) protruding from a lateral end of the housing thereof and extending below the bight portion 233 to produce an interference with the same. As such, the CIS module 14 can be prevented from escaping from the load-bearing portion 24 in an upward direction.

Furthermore, as shown in FIGS. 1 and 2, the image scanning apparatus further comprises a motor drive assembly 31 disposed on the bottom wall 111 of the base 11 in proximity to one end of the guide rod 13, and a conveyor belt 32 wound around a pulley 15 and a gear 16 that are respectively disposed on the bottom wall 111 in proximity to the two opposite ends of the guide rod 13. The gear 16, which is located on the same side of the motor drive assembly 31, is actuated by the motor drive assembly 31 to drive the conveyor belt 32 to move around the pulley 15 and the gear 16. With reference to FIG. 5, one of the lateral walls 274 of the main seat 27 is provided with a fixing portion 276 to fix the second support bracket 22 to the conveyor belt 32, so that the carrier 2 together with the CIS module 14 is carried by the conveyor belt 32 to slide along the guide rod 13 between the two opposite ends thereof for a document scanning operation.

Because the carrier 2 can provide an upward supporting force through the elastic member 23 which is disposed between the first and second support brackets 21, 22 so as to push upwardly the first support bracket 21 together with the CIS module 14, the transparent plate 122 can press downwardly the CIS module 14, so that the skid pads 140 which are provided on the lateral end of the top surface of the housing of the CIS module 14 are kept in constant contact with the transparent plate 122. Hence, high quality scanned images can be obtained. Simultaneously, the protruding rib 26 extends into the limiting hole 29 to restrict horizontal movement of the first support bracket 21 relative to the second support bracket 22, so that the CIS module 14 does not sway in a left-right direction during scanning.

Figure 6:
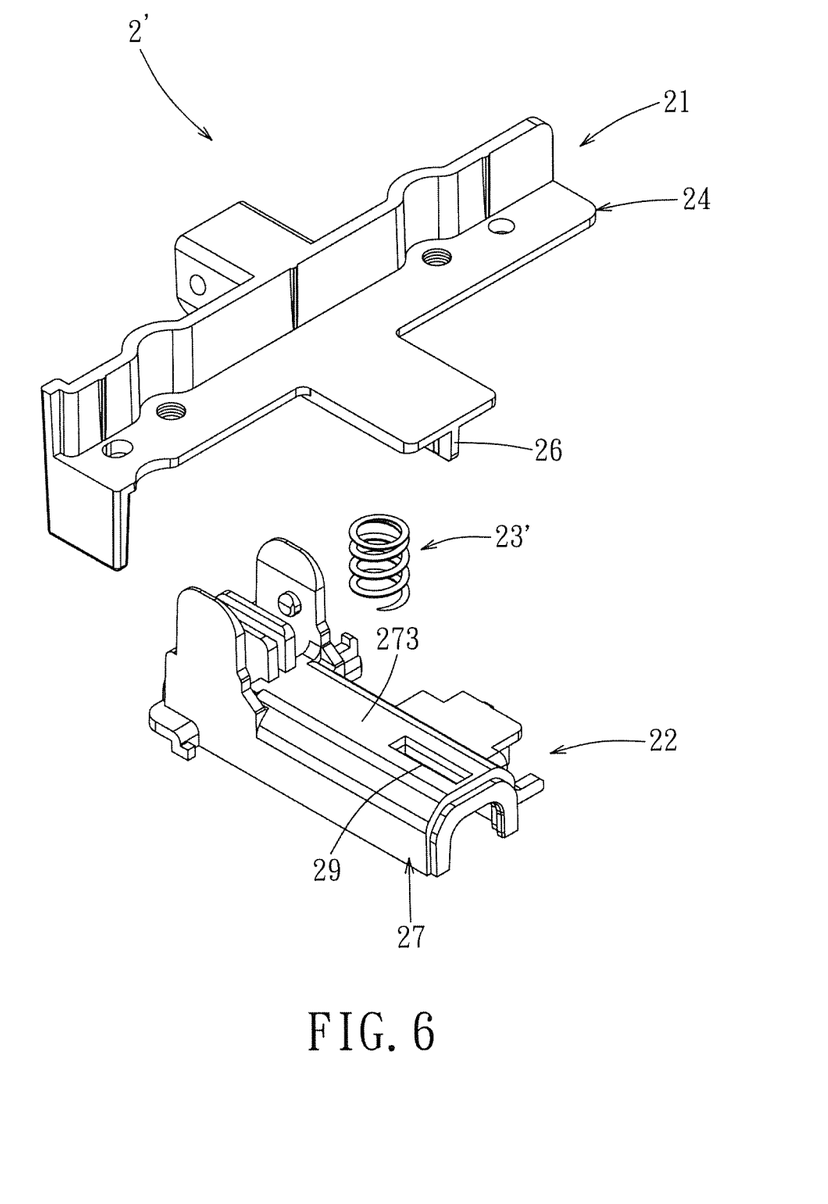
FIG. 6 is an exploded perspective view of a carrier of an image scanning apparatus according to the second preferred embodiment of this invention.

Referring to FIG. 6, a carrier 2' of the image scanning apparatus according to the second preferred embodiment of this invention is shown to be similar to the first preferred embodiment. However, in this embodiment, the elastic member 23' is a compression spring that has one end fixed to the top wall 273 of the main seat 27 of the second support bracket 22, and the other end biasing upward the load-bearing portion 24 of the first support bracket 21. Similarly, the elastic member 23' can provide an upward supporting force to push upwardly the first support bracket 21 together with the CIS module 14, so that the skid pads 140 on the top surface of the CIS module 140 can be kept in constant contact with the transparent plate 122, thereby obtaining high quality scanned images.

Figure 7:
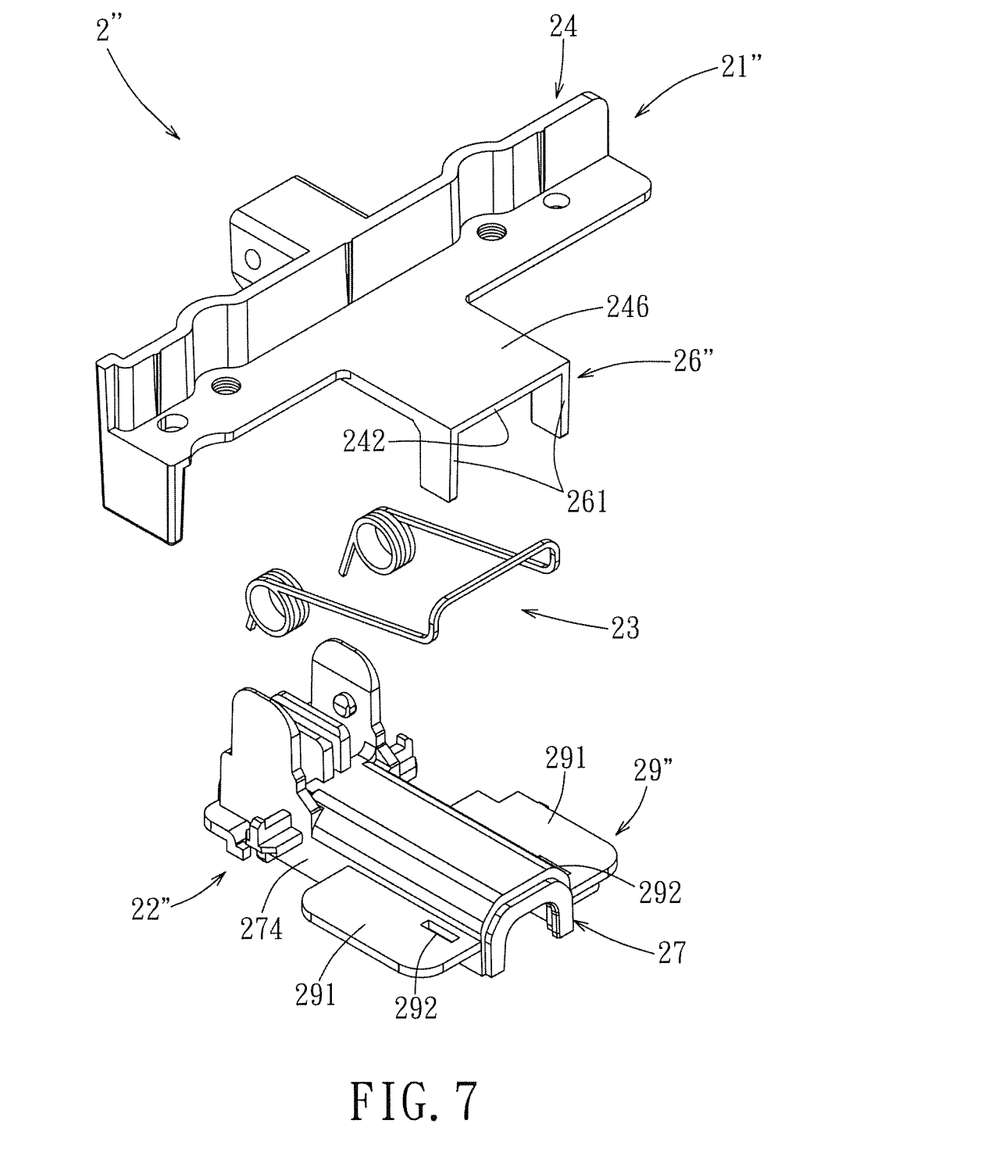
FIG. 7 is an exploded perspective view of a carrier of an image scanning apparatus according to the third preferred embodiment of this invention.

Referring to FIG. 7, a carrier 2" of the image scanning apparatus according to the third preferred embodiment of this invention is shown to be similar to the first preferred embodiment. However, in this embodiment, the first limiting portion 26" of the first support bracket 21" includes two protruding ribs 261 that extend downwardly and respectively from two opposite ends of the second plate surface 246 in proximity to the second lateral end 242 of the load-bearing portion 24. Further, the second limiting portion 29" includes two limiting lugs 291 projecting outwardly and respectively from the lateral walls 274 the main seat 27, and two limiting holes 292 respectively formed in the limiting lugs 291 and respectively receiving the protruding ribs 261. When the CIS module 14 is pressed downwardly by the transparent plate 122, the two protruding ribs 261 of the first limiting portion 26" are retained in the respective limiting holes 292 of the second limiting portion 29" so as to stably restrict horizontal movement the first support bracket 21" relative to the second support bracket 22". As such, the CIS module 14 does not sway in a left-right direction during scanning.

Figure 8:
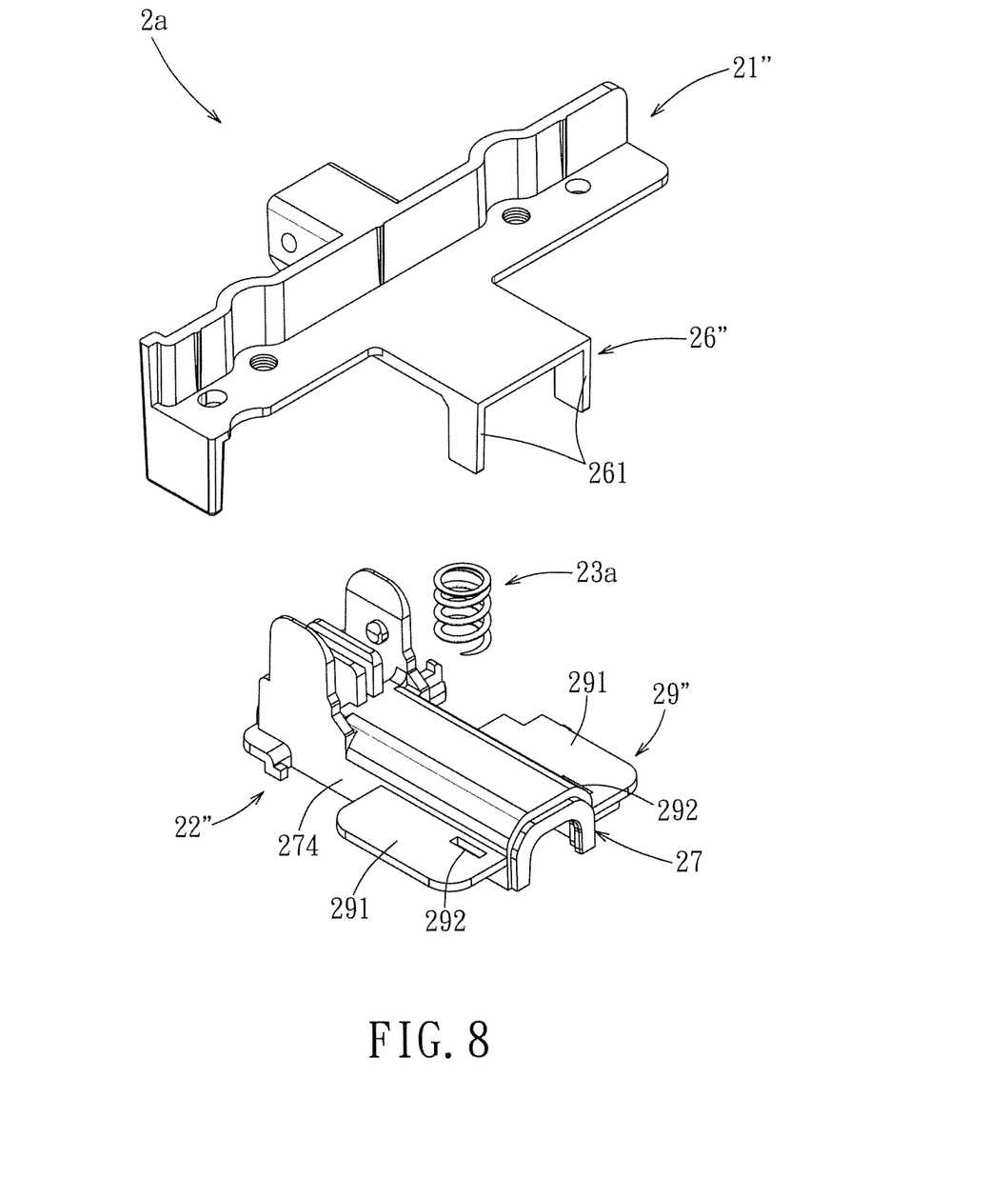
FIG. 8 is an exploded perspective view of a carrier of an image scanning apparatus according to the fourth preferred embodiment of this invention.

Referring to FIG. 8, a carrier (2a) of the image scanning apparatus according to the fourth preferred embodiment of this invention is shown to be similar to the third preferred embodiment. The difference resides in that the elastic member (23a) of this embodiment is configured as a compression spring.

In sum, by using the first support bracket 21, 21" of the carrier 2, 2', 2", (2a) to support and carry the CIS module 14 in each of these preferred embodiments, in comparison with the conventional carrier box that accommodates the CIS module 14, the overall volume or size, the assembly process, the number of assembly components, and costs of the machine can be effectively reduced so as to achieve the purpose of lightweight and miniaturization. Furthermore, because the elastic member 23, 23', (23a) that is disposed between the first and second support brackets 21, 21", 22, 22" can provide an upward supporting force to push upwardly the first support bracket 21 together with the CIS module 14, the CIS module 140 can be kept in constant contact with the transparent plate 122. Moreover, because the first limiting portion 26, 26" of the first support bracket 21, 21" and the second limiting portion 29, 29" of the second support bracket 22 can be interengaged with each other, horizontal movement of the first support bracket 21 relative to the second support bracket 22 can be restricted, so that the CIS module 14 does not sway in a left-right direction during scanning. Hence, high quality scanned images can be obtained. Therefore, the objects of this invention can be realized.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A carrier for mounting on a guide rod of a flatbed scanning apparatus and for carrying an optical sensor module, said carrier comprising:

a first support bracket including a load-bearing portion for supporting the optical sensor module and having opposite first and second lateral ends, a first pivot connecting portion extending outwardly from said first lateral end, and a first limiting portion extending downwardly from a bottom surface of said load-bearing portion in proximity to said second lateral end;

a second support bracket disposed below said first support bracket and including a main seat adapted to be mounted slidably on the guide rod and having opposite first and second ends, a second pivot connecting portion extending upwardly from said main seat in proximity to said first end and connected pivotally to said first pivot connecting portion, and a second limiting portion provided on said main seat in proximity to said second end and corresponding in position to said first limiting portion, said first and second limiting portions cooperating with each other to restrict horizontal movement of said first support bracket relative to said second support bracket; and an elastic member disposed between said first and second support brackets and biasing upwardly said first support bracket.

2. The carrier as claimed in claim 1, the optical sensor module is a contact image sensor module, wherein said load-bearing portion includes a first horizontal plate for placement of the optical sensor module thereto and having said first lateral end, and a first vertical plate extending upwardly from said first lateral end, said first horizontal plate being provided with a threaded hole for fastening fixedly the optical sensor module thereto, said first pivot connecting portion protrudingly extending from said first vertical plate away from said first horizontal plate, said first pivot connecting portion including a second horizontal plate, two second vertical plates extending downwardly from two opposite ends of said second horizontal plate, and two pin holes respectively formed in said second vertical plates, said second pivot connecting portion including two spaced-apart pivot connecting plates extending upwardly from said main seat and respectively disposed on outer sides of said second vertical plates, and two pivot pins respectively extending from inner sides of said pivot connecting plates into pivotal engagement with respective said pin holes in said second vertical plates.

3. The carrier as claimed in claim 2, wherein said first horizontal plate is further provided with a positioning hole that is proximate to said threaded hole and that is adapted to receive a positioning stud provided on a bottom surface of the optical sensor module.

4. The carrier as claimed in claim 2, wherein said main seat of said second support bracket has an opening that faces downwardly, and is adapted to be straddled on the guide rod so that said second support bracket is slidable along the guide rod, said main seat including a top wall extending between said first and second ends, two lateral walls extending downwardly and respectively from two opposite long sides of said top wall, and two fixing posts protruding outwardly and respectively from said lateral walls, said elastic member being a double torsion spring that has two coiled ends respectively fixed to said fixing posts, and an intermediate section connecting said coiled ends and biasing upwardly said load-bearing portion.

5. The carrier as claimed in claim 4, wherein said intermediate section of said double torsion spring includes two spaced-apart arms connected respectively to and extending upwardly and inclinedly from said coiled ends toward said second end of said main seat, and an inverted U-shaped bight portion connected between said arms opposite to said coiled ends and disposed higher than said first horizontal plate, the optical sensor module being disposed between said load-bearing portion and said bight portion, and having a positioning protrusion extending below said bight portion to produce an interference with said bight portion.

6. The carrier as claimed in claim 4, wherein said first horizontal plate is substantially T-shaped, and includes a first plate surface connected to said first vertical plate, and a second plate surface connected to said first plate surface opposite to said first vertical plate and having said second lateral end of said load-bearing portion.

7. The carrier as claimed in claim 6, wherein said first limiting portion is a protruding rib that protrudes downwardly from a bottom surface of said second plate surface in proximity to said second lateral end of said load-bearing portion, and said second limiting portion is a limiting hole that is formed in said top wall and receiving said protruding rib.

8. The carrier as claimed in claim 6, wherein said first limiting portion includes two protruding ribs extending downwardly and respectively from two opposite ends of said second plate surface in proximity to said second lateral end of said load-bearing portion, and said second limiting portion includes two limiting lugs projecting outwardly and respectively from said lateral walls said main seat, and two limiting holes that are respectively formed in said limiting lugs and that respectively receive said protruding ribs.

9. The carrier as claimed in claim 2, wherein said elastic member is a compression spring having one end fixed to said top wall of said main seat, and the other end biasing upwardly said load-bearing portion of said first support bracket.

10. An image scanning apparatus comprising:

a base having a bottom wall and a surrounding wall extending upwardly from a peripheral edge of said bottom wall;

a platform mounted to and covering said base, and including a transparent plate facing said base;

a guide rod disposed between said base and said transparent plate;

an optical sensor module; and a carrier mounted on said guide rod and carrying said optical sensor module, said carrier including a first support bracket including a load-bearing portion to support said optical sensor module and having opposite first and second lateral ends, a first pivot connecting portion extending outwardly from said first lateral end, and a first limiting portion extending downwardly from a bottom surface of said load-bearing portion in proximity to said second lateral end;

a second support bracket disposed below said first support bracket and including a main seat mounted slidably on the guide rod and having opposite first and second ends, a second pivot connecting portion extending upwardly from said main seat in proximity to said first end and connected pivotally to said first pivot connecting portion, and a second limiting portion provided on said main seat in proximity to said second end and corresponding in position to said first limiting portion, said first and second limiting portions cooperating with each other to restrict horizontal movement of said first support bracket relative to said second support bracket; and an elastic member disposed between said first and second support brackets and biasing upwardly said first support bracket so as to keep said optical sensor module in constant contact with said transparent plate of said platform.

11. The image scanning apparatus as claimed in claim 10, wherein said optical sensor module is a contact image sensor module, said load-bearing portion including a first horizontal plate to place said optical sensor module thereto and having said first lateral end, and a first vertical plate extending upwardly from said first lateral end, said first horizontal plate being provided with a threaded hole to fixedly fasten said optical sensor module thereto, said first pivot connecting portion protrudingly extending from said first vertical plate away from said first horizontal plate, said first pivot connecting portion including a second horizontal plate, two second vertical plates extending downwardly from two opposite ends of said second horizontal plate, and two pin holes respectively formed in said second vertical plates, said second pivot connecting portion including two spaced-apart pivot connecting plates extending upwardly from said main seat and respectively disposed on outer sides of said second vertical plates, and two pivot pins respectively extending from inner sides of said pivot connecting plates into pivotal engagement with respective said pin holes in said second vertical plates.

12. The image scanning apparatus as claimed in claim 11, wherein said first horizontal plate is further provided with a positioning hole that is proximate to said threaded hole, and said optical sensor module has a positioning stud provided on a bottom surface thereof and extending into said positioning hole.

13. The image scanning apparatus as claimed in claim 11, wherein said main seat of said second support bracket is straddled on said guide rod so that said second support bracket is slidable along said guide rod, said main seat including a top wall extending from said first end to said second end, two lateral walls extending downwardly and respectively from two opposite long sides of said top wall, and two fixing posts protruding outwardly and respectively from said lateral walls, said elastic member being a double torsion spring that has two coiled ends respectively fixed to said fixing posts, and an intermediate section connecting said coiled ends and biasing upwardly said load-bearing portion.

14. The image scanning apparatus as claimed in claim 13, wherein said intermediate section of said double torsion spring includes two spaced-apart arms connected respectively to and extending upwardly and inclinedly from said coiled ends toward said second end of said main seat, and an inverted U-shaped bight portion connected between said arms opposite to said coiled ends and disposed higher than said first horizontal plate, said optical sensor module being disposed between said load-bearing portion and said bight portion, and having a positioning protrusion that extends below said bight portion to produce an interference with said bight portion.

15. The image scanning apparatus as claimed in claim 13, wherein said first horizontal plate is substantially T-shaped, and includes a first plate surface connected to said first vertical plate, and a second plate surface connected to said first plate surface opposite to said first vertical plate and having said second lateral end of said load-bearing portion.

16. The image scanning apparatus as claimed in claim 15, wherein said first limiting portion is a protruding rib that protrudes downwardly from a bottom surface of said second plate surface in proximity to said second lateral end of said load-bearing portion, and said second limiting portion is a limiting hole that is formed in said top wall and receiving said protruding rib.

17. The image scanning apparatus as claimed in claim 15, wherein said first limiting portion includes two protruding ribs that extend downwardly and respectively from two opposite ends of said second plate surface in proximity to said second lateral end of said load-bearing portion, and said second limiting portion includes two limiting lugs projecting outwardly and respectively from said lateral walls of said main seat, and two limiting holes that are respectively formed in said limiting lugs and that respectively receive said protruding ribs.

18. The image scanning apparatus as claimed in claim 11, wherein said elastic member is a compression spring having one end fixed to said top wall of said main seat, and the other end biasing upwardly said load-bearing portion of said first support bracket.

* * * * *